United States Patent
Reyes Lopez et al.

(10) Patent No.: US 12,553,549 B2
(45) Date of Patent: Feb. 17, 2026

(54) QUICK-LATCH CLAMP WITH CONSTRAINING T-BOLT

(71) Applicant: Norma U.S. Holding LLC, Auburn Hills, MI (US)

(72) Inventors: David Reyes Lopez, Cd. Juarez (MX); Miguel Angel Gallegos de la Peña, Cd. Juarez (MX); Julia A. Vang, Shelby Township, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 245 days.

(21) Appl. No.: 18/398,368

(22) Filed: Dec. 28, 2023

(65) Prior Publication Data
US 2024/0229988 A1 Jul. 11, 2024

Related U.S. Application Data

(60) Provisional application No. 63/435,682, filed on Dec. 28, 2022.

(51) Int. Cl.
*F16L 21/06* (2006.01)
(52) U.S. Cl.
CPC .................................. *F16L 21/065* (2013.01)
(58) Field of Classification Search
CPC . F16L 33/04; F16L 23/08; F16L 23/10; F16L 21/06; F16L 21/065; F16B 2/08; B25B 5/147
See application file for complete search history.

(56) References Cited

U.S. PATENT DOCUMENTS 2,368,929 A * 2/1945 King ....................... F16L 33/04
24/279
2,816,343 A * 12/1957 Decker, Jr. ................ F16B 2/08
24/279
(Continued)

FOREIGN PATENT DOCUMENTS

CN 201121785 Y 9/2008
DE 102016001874 A1 * 8/2016 ............ F16L 21/065
(Continued)

OTHER PUBLICATIONS

International Search Report for International Application No. PCT/US2023/086147 dated May 1, 2024 (3 pages).
(Continued)

*Primary Examiner* — Jonathan P Masinick
(74) *Attorney, Agent, or Firm* — REISING ETHINGTON, P.C.

(57) ABSTRACT

A T-bolt clamp includes a circumferentially extending band and a fastening assembly that employs a T-bolt to tighten the clamp by turning a nut to draw loop ends of the band toward each other. One of the loop ends includes a slotted opening that permits a head of the T-bolt to be inserted and removed without removing the nut from the T-bolt. The fastening assembly is configured to constrain first and second bearing loops of the slotted loop end against movement away from each other during tightening of the clamp. Protrusions on the head of the T-bolt can be used to perform the constraining function by engaging slots in the bearing loops.

19 Claims, 5 Drawing Sheets

(56) References Cited

U.S. PATENT DOCUMENTS

| | | | | |
|---|---|---|---|---|
| 2,837,383 | A | * | 6/1958 | Skelly ............... F16C 33/08 |
| | | | | 29/521 |
| 2,893,097 | A | * | 7/1959 | Hill ............... F16L 33/04 |
| | | | | 24/279 |
| 2,915,800 | A | * | 12/1959 | Graef ............... F16L 33/04 |
| | | | | 24/279 |
| 2,936,503 | A | * | 5/1960 | Rindfleisch ........... F16L 23/10 |
| | | | | 24/279 |
| 4,381,020 | A | * | 4/1983 | Daghe ............... F16L 21/005 |
| | | | | 24/279 |
| 5,329,673 | A | * | 7/1994 | Mason ............... F16L 33/04 |
| | | | | 24/19 |
| 7,441,311 | B2 | * | 10/2008 | Lovgren ............... F16L 23/08 |
| | | | | 24/279 |
| 7,520,539 | B2 | * | 4/2009 | Ignaczak ............ F01N 13/1872 |
| | | | | 285/410 |
| 8,020,898 | B2 | * | 9/2011 | Ignaczak ............... F16L 21/08 |
| | | | | 285/373 |
| 8,136,211 | B2 | * | 3/2012 | Prevot ............... F16L 33/04 |
| | | | | 24/279 |
| 9,103,476 | B2 | * | 8/2015 | Geese ............... F16L 21/065 |
| 11,536,401 | B2 | * | 12/2022 | Rigollet ............... F16L 21/03 |
| 2022/0299054 | A1 | * | 9/2022 | Gallegos de la Peña ............... |
| | | | | F16B 5/08 |

FOREIGN PATENT DOCUMENTS

| | | | | | |
|---|---|---|---|---|---|
| DE | 102018108606 | A1 | * | 10/2019 | ............... F16B 2/08 |
| FR | 859349 | A | * | 12/1940 | |
| GB | 573695 | A | * | 12/1945 | ............ F16L 21/005 |
| GB | 575651 | A | * | 2/1946 | ............. F16L 33/04 |
| GB | 836036 | A | * | 6/1960 | ............. F16L 23/10 |
| GB | 1033659 | A | | 6/1966 | |
| GB | 1308043 | A | * | 2/1973 | ............. F16L 23/10 |
| GB | 2489549 | A | * | 10/2012 | ............. F16L 23/10 |
| JP | H0536193 | U | | 5/1993 | |
| KR | 20080003982 | U | * | 9/2008 | ............. F16L 33/04 |
| KR | 101513133 | B1 | | 4/2015 | |

OTHER PUBLICATIONS

Written Opinion for International Application No. PCT/US2023/086147 dated May 1, 2024 (4 pages).

* cited by examiner

QUICK-LATCH CLAMP WITH CONSTRAINING T-BOLT

CROSS-REFERENCE TO RELATED APPLICATION

This application claims the benefit of U.S. Provisional Patent Application No. 63/435,682, with a filing date of Dec. 28, 2022, the contents of which are hereby incorporated by reference in their entirety.

TECHNICAL FIELD

This disclosure relates generally to pipe clamps and, more particularly, to T-bolt clamps used for mechanically fastening objects together.

BACKGROUND

T-bolt clamps can be used as band clamps for securing tubular members together in a telescopic, or overlapping, manner. Alternatively, they can be used as pipe couplers such as in V-band clamps for connecting flanged ends of pipes or other tubular members together in an abutting configuration. These types of clamps use a threaded T-bolt and nut to pull opposite ends of the band toward each other to tighten the clamp around the perimeter of the tubular members being joined. Applications of use are wide-ranging, and can include automotive, aerospace, marine, industrial, and infrastructure applications, among many other possibilities.

U.S. Pat. No. 7,441,311 to Lovgren et al. discloses a quick-latch clamp that permits the T-bolt to be disengaged from a loop end of the band without removing the nut, which requires omission of band material at the loop end and results in a weakened loop end. Lovgren et al. devised an insert to be placed in the weakened loop end against which the T-bolt is tightened when installing the clamp. The insert distributes some of the clamp load away from the weakened band material. While certainly state-of-the-art at the time, such inserts represent additional cost and manufacturing complexity. Other proposed solutions, such as a thickened loop end or a strengthened loop end extension, also require additional components and manufacturing operations.

SUMMARY

In an embodiment, a T-bolt clamp may include a band and a fastening assembly. The band may have first and second loop ends and a body that extends circumferentially between the first and second loop ends. The fastening assembly may be connected to the loop ends and may include a T-bolt fastener, a trunnion, and a nut. The T-bolt fastener may include a T-bolt having a head and a threaded shank. The head may engage the first loop end, and the threaded shank may extend from the head to the second loop end. The trunnion may be connected to the second loop end with the shank extending through the trunnion, and the nut may be threaded onto the shank and to engage the trunnion. The loop ends may be drawn toward each other to tighten the clamp when the nut is further threaded onto the shank to draw the trunnion toward the head of the T-bolt. The first loop end may include a slotted opening that permits the head of the T-bolt to be inserted into and removed from the first loop end without removing the nut from the threaded shank, and the slotted opening may define first and second bearing loops in the first loop end that retain the head of the T-bolt in the first loop end during tightening of the clamp. The head of the T-bolt may include a protrusion received by a slot in one of the bearing loops.

In another embodiment, a T-bolt clamp may include a band and a fastening assembly. The band may have first and second loop ends and a body that extends circumferentially between the first and second loop ends. The fastening assembly may be connected to the loop ends and may include a T-bolt fastener, a trunnion, and a nut. The T-bolt fastener may include a T-bolt having a head and a threaded shank. The head may engage the first loop end, and the threaded shank may extend from the head to the second loop end. The trunnion may be connected to the second loop end with the shank extending through the trunnion, and the nut may be threaded onto the shank to engage the trunnion. The loop ends may be drawn toward each other to tighten the clamp when the nut is further threaded onto the shank to draw the trunnion toward the head of the T-bolt. The first loop end may include a slotted opening that permits the head of the T-bolt to be inserted into and removed from the first loop end without removing the nut from the threaded shank, and the slotted opening may define first and second bearing loops in the first loop end that retain the head of the T-bolt in the first loop end during tightening of the clamp. The fastening assembly may be configured to constrain the first and second bearing loops against movement away from each other during tightening of the clamp.

BRIEF DESCRIPTION OF THE DRAWINGS

Embodiments of the disclosure are described with reference to the appended drawings, in which.

DETAILED DESCRIPTION

Figure 1:
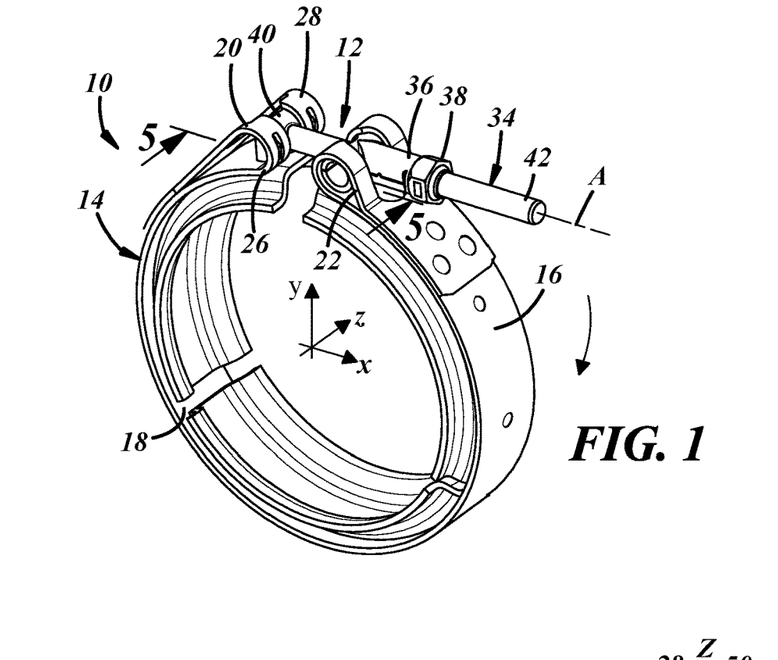
FIG. 1 is a perspective view of an embodiment of a T-bolt clamp.

FIG. 1 is a perspective view of an embodiment of a T-bolt clamp 10, including a fastening assembly 12 connected to a flexible, flat metal band 14 having an inner surface 16 and an outer surface 18. The band 14 is illustrated separately in FIG. 2 and has a body portion 15 extending circumferentially between a first loop end 20 and a second loop end 22 and is adapted to mechanically fasten a pair of tubular bodies together at their ends. The clamp 10 in the figures includes a segmented inner ring adapted to fasten flanged ends of tubular bodies together in an abutting manner. The loop ends 20, 22 are formed by end portions of the band 14 being bent back and attached to the outer surface 18 of the band 14 via spot welds or other suitable means. A slotted opening 24 is formed through the first loop end 20 and defines first and second bearing loops 26, 28 spaced apart in an axial (z) direction of the clamp 10. Likewise, a slotted opening 30 is formed through the second loop end 22 and defines another pair of axially spaced bearing loops 32.

Referring again to FIG. 1, the fastening assembly 12 includes a T-bolt 34, a trunnion 36, and a nut 38. The T-bolt 34 has a head 40 and a shank 42 extending from the head. The head 40 is pivotally received within the bearing loops 26, 28 of the first loop end 20 of the band 14. The trunnion 36 is pivotally received within the bearing loops 32 of the second loop end 22 of the band 14. The shank 42 of the T-bolt 34 is at least partially threaded (not shown) and extends through a passageway of the trunnion 36. The nut 38 is received on the threaded portion of the shank 42.

Figures 2, 3, 4:
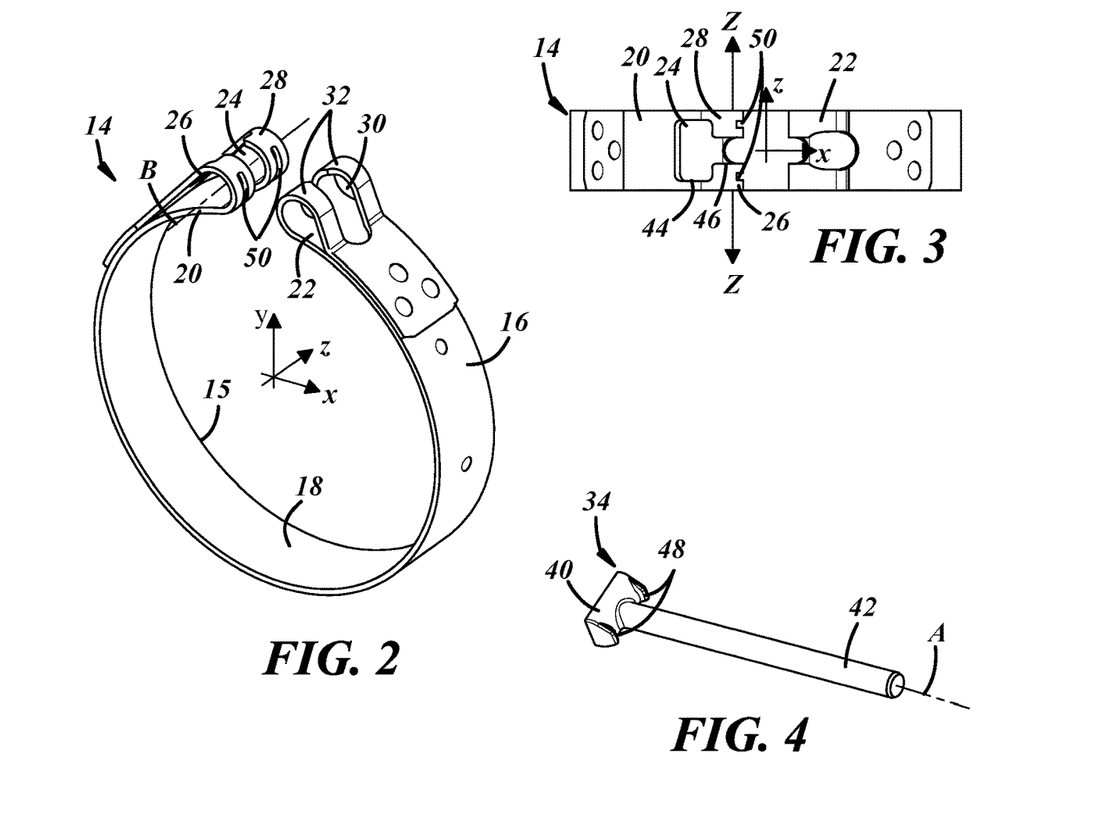
FIG. 2 is a perspective view of a band of the T-bolt clamp of FIG. 1.
FIG. 3 is a top view of the band of FIG. 2.
FIG. 4 is a perspective view of a T-bolt of the clamp of FIG. 1.

As best shown in the top view of the band 14 in FIG. 3, the slotted opening 24 includes a widened section 44 that allows the head 40 of the bolt 34 to be inserted into and removed from the space within the first loop end 20. The widened section 44 has an axial (z) dimension greater than the longest dimension of the bolt head 40. The slotted opening 24 also includes a narrowed section 46 delimited by the bearing loops 26, 28 on axially opposite sides. The narrowed section 46 has an axial (z) dimension greater than a diameter of the bolt shank 42, but less than the longest dimension of the bolt head 40. This construction provides a quick-latch feature to the clamp 10 by allowing the clamp to be quickly installed around the objects being joined by permitting the head 40 of the T-bolt 34 to be inserted into the first loop end 20 via the slotted opening 24 with the nut 38 already threaded onto the shank 42 rather than having to unthread the nut 38 to install the clamp. To tighten the clamp, the nut 38 is rotated into engagement with the trunnion 36. Continued rotation of the nut 38 draws the loop ends 20, 22 toward each other as a result of the engagement of the bolt head 40 with the bearing loops 26, 28 and the trunnion 36 with the bearing loops 32.

As noted above, the omission of band material required to provide the slotted openings 24, 30 in the end loops 20, 22 locally weakens the band 14. In particular, the residual width of band material at the widened section 44 of the slotted opening 24 in the first end loop 20 becomes the weakest section of the band 14. During tightening of the clamp 10, the head 40 of the T-bolt 34 applies an increasing load to inner surfaces of the bearing loops 26, 28 in the direction of the bolt axis A. In the absence of mitigating features, continued increases in the bolt 40 load, such as during overtightening of the clamp 10, tend to spread the bearing loops 26, 28 apart in the axial direction Z as annotated in FIG. 3.

The fastening assembly 12 of the illustrated T-bolt clamp 10 is configured to constrain the first and second bearing loops 26, 28 against movement away from each other during tightening of the clamp 10. In particular, the clamp 10 includes complementary engagement features 48, 50 to provide that constraint. The illustrated engagement features include one or more protrusions 48 (FIG. 4) and one or more slots 50 (FIGS. 2 and 3) that receive the protrusions. Here, the T-bolt 34 includes the protrusions 48 and the band 14 includes the associated slots 50. More particularly, the head 40 of the T-bolt 34 includes the protrusions 48, and the bearing loops 26, 28 of the first loop end 20 of the band 14 include the slots 50. It is contemplated that the engagement features 48, 50 could be reversed and/or be in some other form that constrains the bearing loops from spreading apart from each other during clamp tightening, such as complementary detents.

As illustrated in FIG. 4, the protrusions 48 may be located on opposite sides of the shank 42 and/or at opposite lengthwise ends of the head 40 of the T-bolt 34 and extend in the direction of the T-bolt axis A—i.e., in the same direction as the shank 42 extends from the head 40 of the bolt. Each slot 50 may be formed at least partially through a respective one of the bearing loops 26, 28. In this example, each slot 50 is a through-slot formed entirely through the thickness of the band material and is elongated in the circumferential direction of the loop end 20 with a width in the axial (z) direction with respect to a loop axis B. Each slot 50 is sized to receive a distal end of one of the protrusions 48 such that each protrusion extends at least partially through the thickness of the respective bearing loop 26, 28.

FIGS. 5-8 are enlarged sequential side cutaway views of a portion of the clamp 10 of FIG. 1 taken through a radial (x-y) plane of the clamp 10, bisecting the slots 50 of the bearing loops 26, 28, and illustrating the quick-latching of the clamp.

Figure 5:
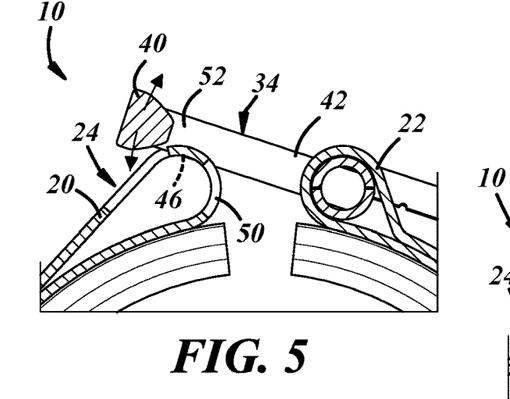
FIG. 5 is a side cutaway view of a portion of the clamp of FIG. 1 with the T-bolt disengaged from a loop end of the band.

In FIG. 5, the T-bolt 34 is disengaged from the first loop end 20 of the band such that the clamp 10 can be spread apart circumferentially at the gap between the first and second loop ends 20, 22 to be installed around a tubular body. The head 40 of the T-bolt 34 is completely outside the first loop end 20 in FIG. 5, and a portion of a proximal end 52 of the shank 42 of the T-bolt is passing through the narrowed section 46 of the slotted opening 24.

Figure 6:
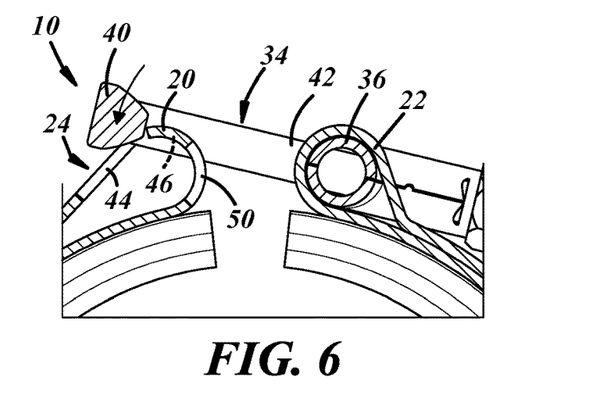
FIG. 6 is the side cutaway view of FIG. 5 with the T-bolt partially inserted in the loop end.

In FIG. 6, the T-bolt 34 is rotated about an axis of the trunnion 36 and the second loop end 22 and further into the slotted opening 24. More of the shank 42 is passing through the narrowed section 46 of the slotted opening 24 than in FIG. 5, and the head 40 of the T-bolt 34 is entering the widened section 44 of the slotted opening.

Figure 7:
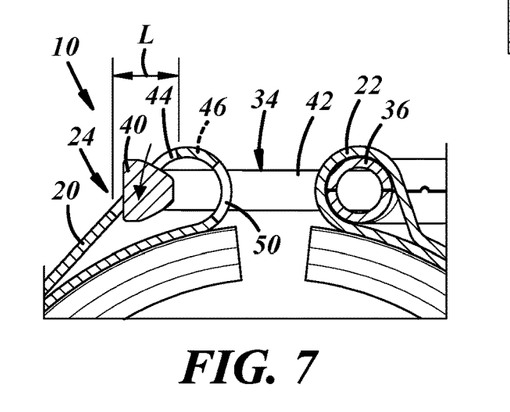
FIG. 7 is the side cutaway view of FIGS. 5-6 with the T-bolt further inserted in the loop end.

In FIG. 7, the T-bolt 34 is further rotated about the axis of the trunnion 36 and the second loop end 22 and further into the slotted opening 24. The head 40 of the T-bolt 34 is now positioned in the widened section 44 of the slotted opening 24, and the shank 42 is passing through the narrowed section 46 of the slotted opening.

Figure 8:
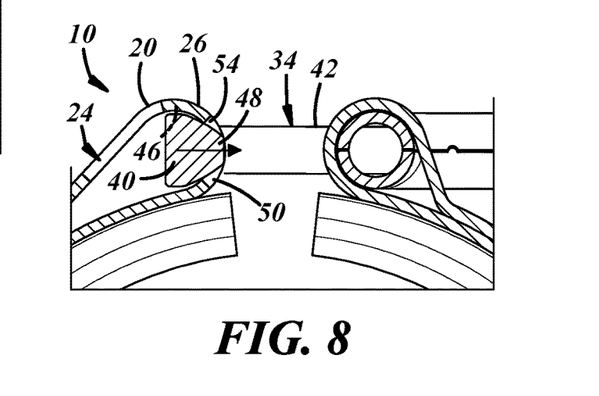
FIG. 8 is the side cutaway view of FIGS. 5-7 with the T-bolt engaging the loop end.

In FIG. 8, the head 40 of the T-bolt 34 is brought into engagement with the bearing loops 26, 28 of the first loop end 20 by threading the already installed nut 38 (not shown) further onto the bolt shank 42 to draw the bolt head 40 toward an inner surface of the loop end 20. The bolt head 40 passes through the slotted opening 24 so that the head is within the loop end 20 and engaging the bearing loops 26, 28 at the narrowed section 46 of the slotted opening 24, which the bolt head 40 is too large to pass through.

When the bolt head 40 is brought into engagement with the inside of the loop end 20, the slots 50 formed through the bearing loops 26, 28 receive the protrusions 48 of the bolt head 40 as shown in FIG. 8. The protrusions 48 engage an inner surface 54 of the slots 50 such that, upon further tightening of the clamp 10 via further turning of the nut 38, the bearing loops 26, 28 are prevented from, or at least constrained from, spreading apart.

Figure 9:
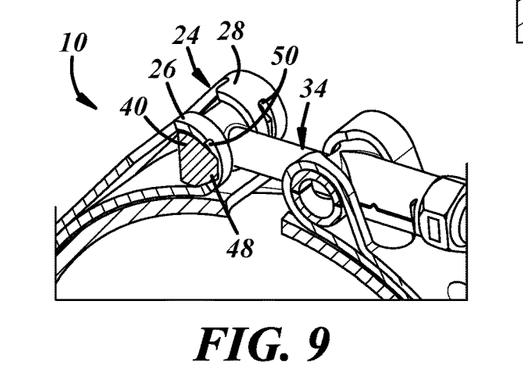
FIG. 9 is an enlarged cutaway view of a portion of the clamp of FIG. 1.

FIG. 9 is a perspective view of the same portion of the clamp 10 illustrated in FIGS. 5-8 and cutaway through the same radial plane with the head 40 of the T-bolt 34 engaged with the bearing loops 26, 28 and with the protrusions 48 of the T-bolt received in the slots 50 to constrain the bearing loops from being spread apart upon further tightening of the clamp.

Figure 10:
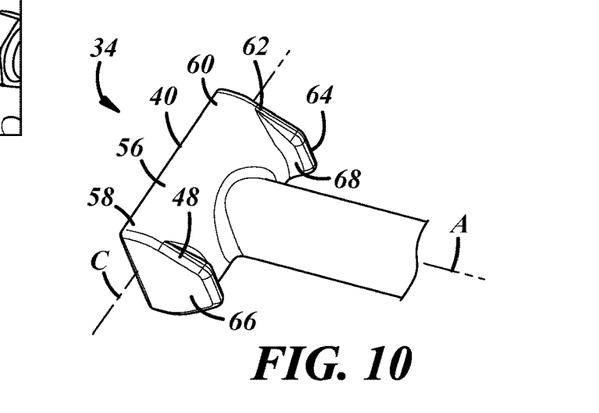
FIG. 10 is an enlarged view of a head of the T-bolt of FIG. 4.

FIG. 10 is an enlarged perspective view of the head 40 of the T-bolt 34 illustrating some of the details of the constraining features 48. The head 40 of the T-bolt 34 includes a head body 56 extending between opposite ends 58, 60. In this example, the head body 56 is semi-cylindrical along a head axis C, which helps minimize the required length L (FIG. 7) of the widened section 44 of the slot. Each protrusion 48 extends from a base or proximal end 62 at the head body 56 to a distal end 64. Each protrusion 48 also has an outer surface 66 and an inner surface 68. Here, the outer surfaces 66 are flat surface coplanar with axial end faces of the had body 56 and face away from each other. The inner surfaces 68 face toward the shank 42 of the bolt 34 and toward each other. Each protrusion 48 is tapered in two directions from the proximal end 62 to the distal end 64 such that the protrusions function as self-locating features with respect to the slots 50 of the band 14. The protrusions 48 may be formed on the bolt head 40 in a heading or upsetting operation in which axial ends of the body 56 are partially mushroomed.

Figure 11:
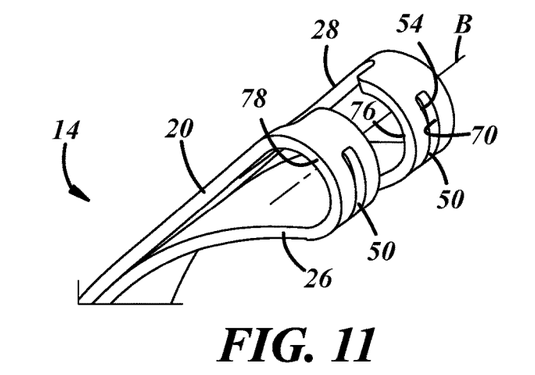
FIG. 11 is an enlarged view of a loop end of the band of FIG. 2.
Figure 12:
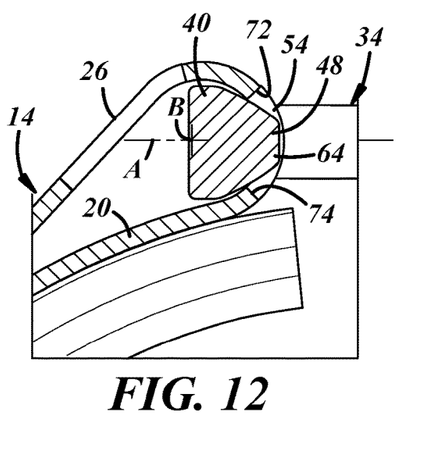
FIG. 12 is an enlarged view of a portion of FIG. 8 with the T-bolt engaged with the loop end.

FIG. 11 is an enlarged view of the first end loop 20 of the band 14 taken from FIG. 2, and FIG. 12 is an enlarged view of the first end loop taken from FIG. 8. As noted above, each slot 50 is formed in the first end loop 20 and, in particular, in a respective one of the bearing loops 26, 28. Each slot 50 is elongated in a circumferential direction about the loop axis B and has an axial width defined by parallel and opposing inner and outer surfaces 54, 70 (outer surface 70 is cutaway in FIG. 12). The inner and outer surfaces 54, 70 of each slot 50 are connected by opposite end surfaces 72, 74 of the respective slot (FIG. 12). Each slot 50 is located at a portion of the first end loop 20 that is closest to the second end loop 22 and is centered about the axis A of the T-bolt 34 in use.

When the T-bolt 34 is engaged with the loop end 20 as in FIG. 12, the body of the bolt head 40 is in contact with an inner surface 76 of each bearing loop 26, 28 and/or each protrusion 48 is in contact with edges of the opposite end surfaces of each slot 50. During tightening or overtightening of the clamp 10, when the head 40 of the T-bolt 34 applies an increasing load against the bearing loops 26, 28, the tendency for the bearing loops to spread apart in the direction of the loop axis B is mitigated by the protrusions 48 constraining the bearing loops via a reaction force at the interface of the protrusions and the inner surface 54 of each slot 50.

Various embodiments include different dimensions and relative dimensions of the engagement features 48, 50. For instance, while the illustrated slots 50 are through-slots formed through the entire thickness of the band materials, they may extend only partially through the thickness of the band material from the inner surface 76. The width of the illustrated slots 50 is approximately one-third of the width of the bearing loop 26, 28 in which it is formed.

Figure 13:
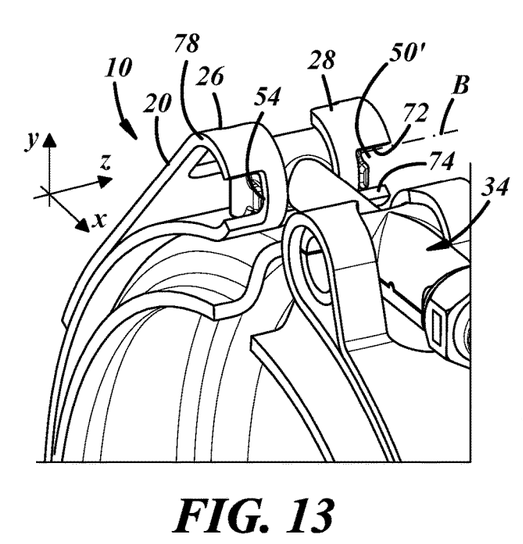
FIG. 13 is a perspective view of a portion of the T-bolt clamp with open slots.
Figure 14:
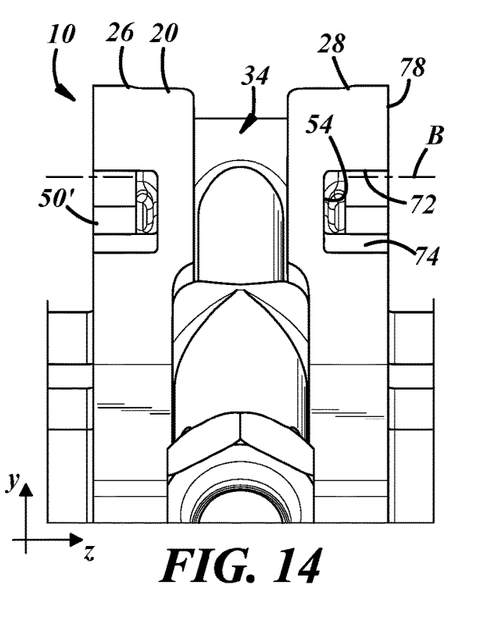
FIG. 14 is an end view of the portion of the T-bolt of FIG. 13.

In a variation illustrated in the perspective view of FIG. 13 and the end view of FIG. 14, the opposite end surfaces 72, 74 of each slot 50' are extended axially outward in the direction (z) of the loop axis B so that each slot 50' is an open slot that opens at axially outer edges 78 of the loop end 20, effectively eliminating the elongated outer surface 70 (FIG. 11) of each slot from the example of, which is not a constraining surface of the slot. The open slots 50' may be referred to as cut-outs.

In the illustrated example, each protrusion 48 extends into the respective slot 50 by approximately the entire thickness of the band material and all the way into the slot 50 such that the distal end 64 of each protrusion is approximately flush with a radially outer surface of the loop end 20. In other embodiments, the protrusion 48 extends into the associated slot 50 by at least half the depth of the slot, or the protrusion extends from the body of the head 40 of the T-bolt 34 by an amount equal to at least half the thickness of the bearing loop 26, 28 in which the slot is defined. While the amount of extension of each protrusion 48 is not particularly limited, some practical limits exist. If for example the protrusions 48 are too short, they may not sufficiently perform their constraining function. And if the protrusions 48 are too long, the ease with which the quick-latch functionality is achieved may be reduced because the initial position of the nut 38 on the shank 42 must be further from the bolt head 40 to permit the bolt head with its protrusions to pass through the slotted opening 24.

Figure 15:
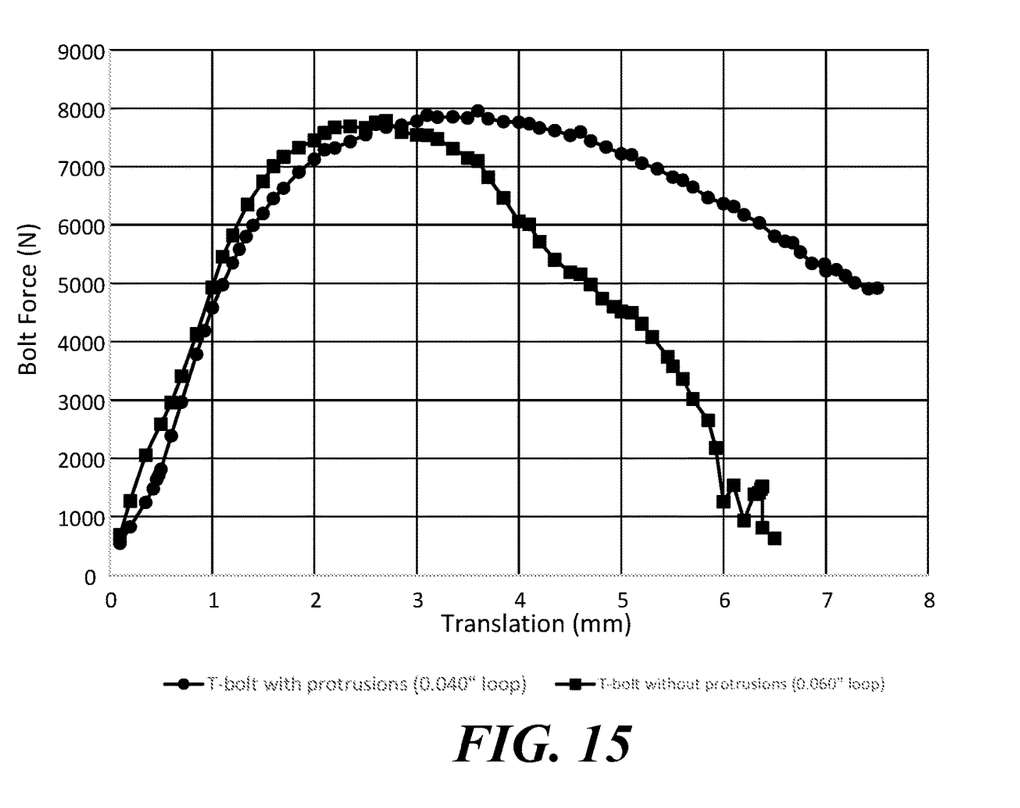
FIG. 15 is a chart comparing T-bolts with and without the disclosed engagement features.

FIG. 15 is a proof-of-concept chart plotting bolt force as a function of translation for a T-bolt 34 with protrusions in accordance with the above description and for a comparative example of a T-bolt without the protrusions. Both T-bolts were placed into engagement with a loop end 20 configured for a quick-latch attachment of the T-bolt head 40 with the loop end—i.e., having a slotted opening 24 formed through the loop end through which the T-bolt passes to engage the inner surface of the loop end. In the case of the T-bolt with protrusions 48, material used for the loop end 20 is the same as that of the body portion 15 of the band 14, which is 0.040" (1.016 mm) strip stock material to simulate a band 14 with unitary construction—i.e., a band in which the loop ends 20, 22 are made from the same thickness material with the loop end being formed by bending the end of the band material back on itself and welding or otherwise attaching it to the surface of the band material. In the case of the T-bolt without protrusions, the material used for the loop end is 0.060" (1.52 mm) strip stock material, which is 50% thicker than the material used with the protrusion-equipped T-bolt. The thicker material simulates a band that is made from more than one piece—i.e., a band in which the loop end that engages the head of the T-bolt is a separate and thicker piece of material than that of the band body.

Each engaged loop end and T-bolt head were placed in tension in the direction of the T-bolt axis, and the tensile force was measured as a function of distance in translation in the tensile direction. Each loop end was tested to failure, simulating an overtightening mode. As indicated in FIG. 15, the maximum tensile load attained with both configurations is approximately the same. But the peak load with the protrusion-equipped T-bolt occurred at a translation approximately 1 mm greater than that of the T-bolt without protrusions. More notably, the T-bolt equipped with the protrusions did not slip through the axial gap between the bearing loops for the full 7.5 mm duration of the test, while the head of the standard was eventually pulled out of the loop end. Also, the tensile force was maintained at a higher level during plastic deformation of the loop end with the protrusion-equipped T-bolt. Notably, the T-bolt/loop pair with engaged protrusions and slots performed as well in terms of maximum load—and better in terms of elongation—than the T-bolt/loop pair employing 50% thicker material.

Figure 16:
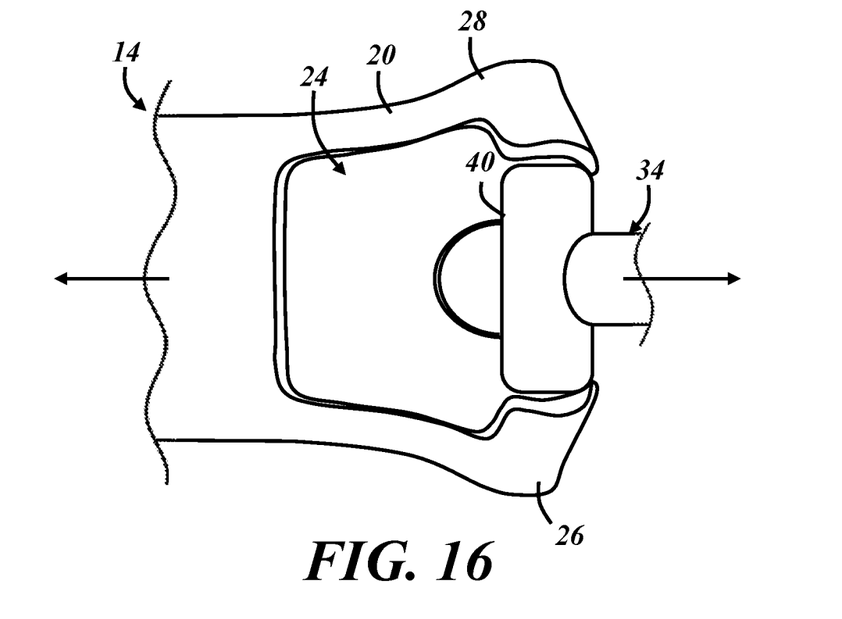
FIG. 16 is a schematic top view showing simulated plastic deformation of a loop end with a standard T-bolt.
Figure 17:
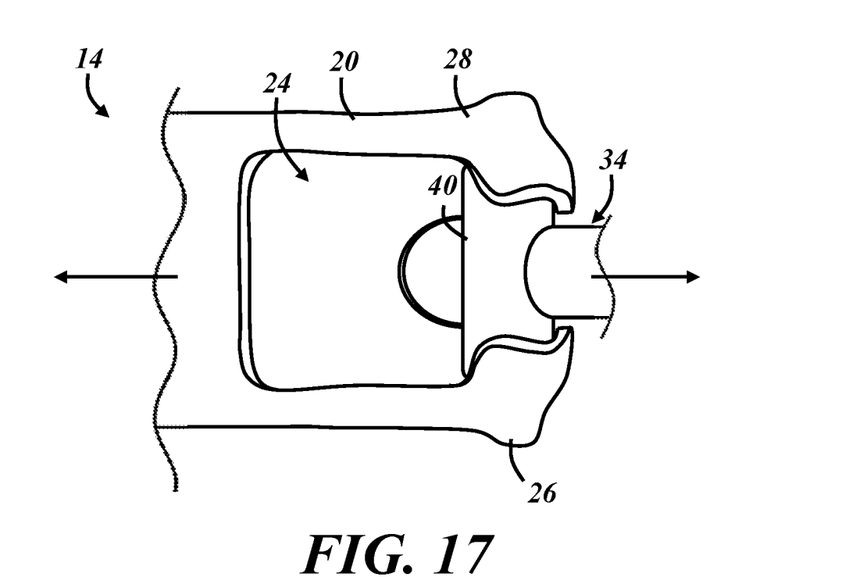
FIG. 17 is a schematic top view showing simulated plastic deformation of the same loop end with a protrusion-equipped T-bolt.

FIGS. 16 and 17 schematically illustrate a simulated shape of the first loop end 20 after plastic deformation according to the tensile test of FIG. 13. Without the protrusions on the head 40 of the T-bolt 34, the bearing loops 26, 28 of the first loop end 20 of the band 14 are spread apart from each other, and the bolt head 40 slips out of the loop end 20 through the slotted opening 24 and between the bearing loops 26, 28, as illustrated in FIG. 14. With the same amount of relative translation, the protrusion-equipped T-bolt 34 remains engaged with the loop end 20 and bearing loops 26, 28 due to the constraint provided by the protrusions and complementary slots. The protrusions effectively grip the bearing loops 26, 28 via the slots to maintain engagement.

The described configuration thus provides improved clamp performance without the separately formed piece described by Lovgren while reducing cost and complexity. The head 40 of the T-bolt 43 directly engages the first and second bearing loops 26, 28 with no separately formed piece inserted in the first loop end 20 between the head of the T-bolt and the first and second bearing loops. The described configuration also provides improved clamp performance without requiring the loop end 20 to be made from a thick or otherwise stronger material than the remainder of the band 14.

As used herein, the terms "general," "generally," "approximately," and "substantially" are intended to account for the inherent degree of variance and imprecision that is often attributed to, and often accompanies, any design and manufacturing process, including engineering tolerances—and without deviation from the relevant functionality and outcome—such that mathematical precision and exactitude is not implied and, in some instances, is not possible. In other instances, the terms "general," "generally," "approximately," and "substantially" are intended to represent the inherent degree of uncertainty that is often attributed to any quantitative comparison, value, and measurement calculation, or other representation.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A T-bolt clamp, comprising:
a band having first and second loop ends and a body that extends circumferentially between the first and second loop ends; and
a fastening assembly connected to the loop ends and including a T-bolt fastener, a trunnion, and a nut,
the T-bolt fastener comprising a T-bolt having a head and a threaded shank, wherein the head engages the first loop end and the threaded shank extends from the head to the second loop end,
the trunnion being connected to the second loop end with the shank extending through the trunnion, and
the nut being threaded onto the shank and engaging the trunnion, wherein the loop ends are drawn toward each other to tighten the clamp when the nut is further threaded onto the shank to draw the trunnion toward the head of the T-bolt;
wherein the first loop end includes a slotted opening that permits the head of the T-bolt to be inserted into and removed from the first loop end without removing the nut from the threaded shank, the slotted opening defining first and second bearing loops in the first loop end that retain the head of the T-bolt in the first loop end during tightening of the clamp, and
wherein the head of the T-bolt includes a protrusion received by a slot in one of the bearing loops.

2. The T-bolt clamp of claim 1, wherein the protrusion is one of a pair of protrusions on opposite sides of the shank, and the slot is one of a pair of slots receiving the pair of protrusions, one of the slots being formed in the first bearing loop and the other of the slots being formed in the second bearing loop.

3. The T-bolt clamp of claim 1, wherein the protrusion extends in a radial direction with respect to the head of the T-bolt.

4. The T-bolt clamp of claim 1, wherein the protrusion extends in an axial direction of the threaded shank.

5. The T-bolt clamp of claim 1, wherein the slot is a through-slot.

6. The T-bolt clamp of claim 1, wherein the protrusion extends into the slot by at least half the depth of the slot.

7. The T-bolt clamp of claim 1, wherein the protrusion extends from a body of the head of the T-bolt by an amount equal to at least half the thickness of the bearing loop having the slot.

8. The T-bolt clamp of claim 1, wherein the protrusion is formed on an axial end of the head of the T-bolt.

9. The T-bolt clamp of claim 1, wherein the protrusion extends from a body of the head of the T-bolt and is tapered in an axial direction of the threaded shank.

10. The T-bolt clamp of claim 1, wherein the band is of unitary construction with the first and second loop ends and the body being formed from a single strip of material having a uniform thickness.

11. The T-bolt clamp of claim 1, wherein the head of the T-bolt directly engages the first and second bearing loops with no separately formed piece inserted in the first loop end between the head of the T-bolt and the first or second bearing loops.

12. The T-bolt of claim 11, wherein the T-bolt remains engaged with the first loop end for a greater distance of travel of the nut relative to the shank of the T-bolt than in the absence of the protrusion.

13. The T-bolt of claim 1, wherein the slot is an open slot.

14. A T-bolt clamp, comprising:

a band having first and second loop ends and a body that extends circumferentially between the first and second loop ends; and a fastening assembly connected to the loop ends and including a T-bolt fastener, a trunnion, and a nut, the T-bolt fastener comprising a T-bolt having a head and a threaded shank, wherein the head engages the first loop end and the threaded shank extends from the head to the second loop end, the trunnion being connected to the second loop end with the shank extending through the trunnion, and the nut being threaded onto the shank and engaging the trunnion, wherein the loop ends are drawn toward each other to tighten the clamp when the nut is further threaded onto the shank to draw the trunnion toward the head of the T-bolt;

wherein the first loop end includes a slotted opening that permits the head of the T-bolt to be inserted into and removed from the first loop end without removing the nut from the threaded shank, the slotted opening defining first and second bearing loops in the first loop end that retain the head of the T-bolt in the first loop end during tightening of the clamp, and wherein the fastening assembly is configured to constrain the first and second bearing loops against movement away from each other during tightening of the clamp.

15. The T-bolt clamp of claim 14, further comprising a protrusion and a slot engaging each other at an interface of the T-bolt and the first loop end to constrain the bearing loops against said movement.

16. The T-bolt clamp of claim 15, wherein the slot is an open slot.

17. The T-bolt clamp of claim 15, wherein the T-bolt includes the protrusion and the band includes the slot.

18. The T-bolt clamp of claim 17, wherein the head of the T-bolt includes the protrusion and the first loop end includes the slot.

19. The T-bolt clamp of claim 18, wherein one of the bearing loops includes the slot.

\* \* \* \* \*